Dec. 23, 1941.  J. BERGER ET AL  2,267,263

SPOKED WHEEL

Filed Nov. 13, 1939

INVENTORS:
Julius Berger
Hermann Klaue
BY
AGENT.

Patented Dec. 23, 1941

2,267,263

UNITED STATES PATENT OFFICE 2,267,263

SPOKED WHEEL

Julius Berger, Berlin-Wilhelmsruh, and Hermann Klaue, Berlin-Frohnau, Germany, assignors to Argus Motoren Gesellschaft m. b. H.

Application November 13, 1939, Serial No. 303,978 In Germany August 16, 1939

3 Claims. (Cl. 301—6)

This invention relates to a spoked wheel and brake assembly, particularly adapted for aircrafts.

As is well known, large braking torques are required for arresting the landing motion of modern aircrafts. Recently, the development of the brake arrangement could not be improved in the same manner as the general development of aircrafts, as the dimensions of the tire are given so that an enlargement of the diameter of the wheel body and thereby an enlargement of the brake disc is not possible. Moreover, larger dimensions of the wheel body would cause an increase in the weight of the carriage supporting the landing wheels which under all circumstances must be prevented. In the contrary, care must be taken that the brake does not increase the weight of the carriage and consequently also that of the aircraft.

The object of the present invention is to provide a brake appliance or brake mechanism by means of which the large brake pressures required for braking modern large and fast travelling aircrafts may easily be produced.

This, according to the invention, is possible without increasing the weight of the carriage supporting the landing wheels and without unduly heating parts of the wheel due to the absorption of the heat resulting from the braking pressure.

The object aimed at is obtained according to the invention substantially by the fact that the spoked wheel consists of two substantially equal halves and that the spokes of each half of the wheel are connected to each other at the surface of both halves facing each other with a view to form a closed braking area.

The spokes are absolutely necessary for the required strength of the wheel and the amount of material required for connecting the spokes to each other is only very small in comparison to the very large heat conducting surface obtained by this connection.

In the accompanying drawing showing by way of example an embodiment of the invention, Fig. 1 is a longitudinal section along the line 1—1 of Fig. 2 showing a spoked wheel and brake assembly embodying the principles of the invention, Fig. 2 is a front view of the wheel of Fig. 1, and Fig. 3 is a section along the line 3—3 of Fig. 1 with parts broken away to show the spokes of one portion of the wheel.

Referring to the drawing, the spoked wheel comprises two substantially equal halves or rim members 10 and 11 secured together by screw bolts 12. A brake assembly, generally designated with 13, is provided between the two rims 10 and 11. The brake 13 is operated in a manner known per se by pressure fluid supplied to the brake assembly 13 by conduit 14.

Wheel rim members, 10, 11 are supported by short spokes 15 and long spokes 15'. The individual spokes 15, 15' of the wheel are thickened at their bases or roots as at 16 to form a closed coherent area extending around the wheel.

Rim members 10, 11 are rotatably mounted in anti-friction bearings 17 and 18, respectively. The hub comprises an inner hub member 19, and adjacent hub portion 20 and an outer hub member 21. Inner hub member 19 supports ball bearing 17. Bearing 17 is pressed against hub portion 19 by an inner ring 22 provided with an inner thread and screwed onto hub portion 19. Outer ring 23 having an outer thread is screwed onto rim 10, thus pressing hub portion 19 against hub portion 20. Rings 22 and 23 are secured against rotation by pins 24 and 25, respectively. Ring 26 has an outer thread and is screwed onto rim 11 to secure bearing 18. Hub portions 20 and 21 are secured together by screw bolts 27. As shown in Fig. 2, the heads of bolts 27 are provided with hexagonal or octagonal inner recesses 28 to permit introduction of a suitable spanner.

Nipple 29 is connected with a hydraulic fluid conduit not shown in the drawing. The hydraulic fluid is supplied through canal 30 in the outer hub member 21 and through conduit 14 in hub portion 20 into an inflatable rubber bag 31. Adjacent rubber bag 31 two metal discs 32, 32 are provided having overlapping flanges. The brake fluid expands rubber bag 31 which forces the two discs 32, 32 apart thus pressing the brake linings 33, 33 fastened on discs 32, 32 against friction liners 34, 34. Liners 34, 34 are secured to rim members 10 and 11, respectively, by screws 35. Screw bolts 36 serve to fasten the brake assembly 13 onto hub portion 20.

A heat insulating annular layer 37 covers the rim members 10, 11 to protect the tire against excessive heat.

The coherent area formed by connecting members or roots 16 of spokes 15, 15' and covered with liners 34, 34 cooperates with the brake linings 33, 33 of the brake assembly 13. On account of the large area of contact between the liners 34, 34, and the brake assembly 13, the brake operates very efficiently. Due to the design in accordance with the invention the spokes 15, 15' are available for conducting away the amount of heat resulting from the braking operation without the necessity to provide any additional cooling means whereby the weight of the wheel would be increased.

What we claim is:

1. A combined wheel and brake assembly particularly adaptable for aircraft, comprising two similar halves comprising rim and hub members supported by spokes, the inside of each set of said spokes being connected by a flange to form areas substantially parallel and facing each other, and a brake mechanism arranged between said areas.

2. In combination a wheel and brake assembly particularly adapted for aircraft, comprising two similar halves rotatably mounted on a fixed axle, said halves comprising rim and hub members supported by spokes, the inside of each set of said spokes being formed to provide substantially parallel and adjacent flanges facing each other, and a brake mechanism arranged between said flanges.

3. In combination a wheel and brake assembly particularly adapted for aircraft, comprising two similar halves rotatably mounted on a fixed shaft, said halves comprising rim and hub members supported by spokes, the inside of each set of said spokes being connected by a flange to form areas facing each other in adjacent relationship, said two flanges being provided with two annular friction liners, and a fixed brake mechanism arranged between said two friction liners.

JULIUS BERGER.
HERMANN KLAUE.